(12) United States Patent
Livny et al.

(10) Patent No.: US 12,047,363 B2
(45) Date of Patent: Jul. 23, 2024

(54) MAINTAINING AND RECOVERING SECURE CLOUD CONNECTIONS

(71) Applicant: Microsoft Technology Licensing, LLC, Redmond, WA (US)

(72) Inventors: Yotam Livny, Gadera (IL); Orr Srour, Ramat-Hasharon (IL); Amir Zyskind, Tel-Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 84 days.

(21) Appl. No.: 17/324,809

(22) Filed: May 19, 2021

(65) Prior Publication Data

US 2022/0377060 A1   Nov. 24, 2022

(51) Int. Cl.
*H04L 9/40* (2022.01)

(52) U.S. Cl.
CPC ........ *H04L 63/068* (2013.01); *H04L 63/0435* (2013.01); *H04L 63/0823* (2013.01); *H04L 63/0861* (2013.01)

(58) Field of Classification Search
CPC ............... H04L 63/068; H04L 63/0435; H04L 63/0823; H04L 63/0861
See application file for complete search history.

(56) References Cited

U.S. PATENT DOCUMENTS

| | | | |
|---|---|---|---|
| 7,254,634 B1 | 8/2007 | Davis et al. | |
| 7,287,082 B1 | 10/2007 | Otoole, Jr. | |
| 7,720,975 B2 | 5/2010 | Erickson | |
| 8,638,781 B2 | 1/2014 | Lawson et al. | |
| 9,621,399 B1 | 4/2017 | Parakh et al. | |
| 9,699,180 B2 | 7/2017 | Wetter et al. | |
| 2011/0270763 A1* | 11/2011 | Graham, III | G06Q 20/3829 705/71 |
| 2013/0311594 A1 | 11/2013 | Luna et al. | |
| 2013/0318347 A1* | 11/2013 | Moffat | H04L 63/08 713/168 |
| 2016/0094543 A1 | 3/2016 | Innes et al. | |
| 2016/0315913 A1 | 10/2016 | Lu et al. | |
| 2016/0366121 A1 | 12/2016 | Rykowski et al. | |
| 2017/0093835 A1* | 3/2017 | Whiteside | H04L 67/14 |
| 2017/0134501 A1* | 5/2017 | Noguchi | H04L 67/02 |
| 2019/0080072 A1* | 3/2019 | Van Os | G06F 3/016 |
| 2019/0268156 A1* | 8/2019 | Delmas | G06F 21/31 |

(Continued)

OTHER PUBLICATIONS

"AWS IoT for the Edge", Retrieved from: https://web.archive.org/web/20190722131100/https://aws.amazon.com/iot/solutions/iot-edge/, Jul. 22, 2019, 14 Pages.

(Continued)

*Primary Examiner* — Shin-Hon (Eric) Chen
*Assistant Examiner* — Brian William Avery
(74) *Attorney, Agent, or Firm* — Holzer Patel Drennan

(57) ABSTRACT

A method enabling recovery of a terminated client-to-cloud processing sessions includes writing at least some data of cloud-based processing session between a cloud based server and a client device to the client device. Responsive to satisfaction of a session termination condition, the stored data is encrypted such that it can be recovered using suitable decryption techniques when the client-to-cloud-connection is subsequently re-established.

19 Claims, 11 Drawing Sheets

(56) References Cited

U.S. PATENT DOCUMENTS

2019/0340376 A1 11/2019 Fleck et al.
2020/0236156 A1 7/2020 Goel et al.

OTHER PUBLICATIONS

Andrade, Fabricio, "What is an edge device, and why is it so crucial to IIoT?", Retrieved from: https://netilion.endress.com/blog/what-is-edge-device-iiot/, Retrieved Date: Apr. 21, 2020, 15 Pages.
Bryson, Sean, "Five components of IoT edge Devices", Retrieved from: https://web.archive.org/web/20191220142702/https://www.cisco.com/c/en/us/solutions/internet-of-things/iot-edge-devices.html, Dec. 20, 2019, 8 Pages.
"About Face ID Advanced Technology", Retrieved From: https://web.archive.org/web/20210203234206/https://support.apple.com/en-in/HT208108, Feb. 26, 2020, 3 Pages.
"OneLogin Desktop—Device trust and the journey to passwordless authentication", Retrieved From: https://web.archive.org/web/20200416080544/https:/www.onelogin.com/product/desktop, Apr. 16, 2020, 6 Pages.
"Simple, Secure Single Sign-on", Retrieved From: https://web.archive.org/web/20200413005930/https://duo.com/product/single sign-on-sso, Apr. 13, 2020, 6 Pages.
"Zero Sign-on: the Solution for Passwordless Authentication", Retrieved From: https://www.mobileiron.com/sites/default/files/Datasheets/zero-sign-on-the-solution-for-passwordless-authentication/ZSO-datasheet-EN-US.pdf, Retrieved Date: Apr. 23, 2020, 2 Pages.
Prema, et al., "A Novel Method for User Authentication on Cloud Computing Using Face Recognition System", In International Journal of Data Mining Techniques and Applications, vol. 5, Issue 1, Jun. 2016, pp. 76-78.
Whitney, Lance, "How to Log Into Websites With Face ID on iPhone X", Retrieved From: https://www.pcmag.com/how-to/how-to-log-into-websites-with-face-id-on-iphone-x, Mar. 14, 2018, 16 Pages.
"International Search Report & Written Opinion issued in PCT Application No. PCT/US22/026612", Mailed Date: Aug. 10, 2022, 11 Pages.

* cited by examiner

MAINTAINING AND RECOVERING SECURE CLOUD CONNECTIONS

BACKGROUND

It is common for client devices to make use of cloud-based processing services for various compute jobs, many of which may depend upon sensitive data such as medical records, identity information, proprietary company data, etc. A request to initialize a cloud processing session may, for example, begin when a user provides access credentials to a cloud database, file system, or other cloud service platform through a client device. To reduce a likelihood of unauthorized access to sensitive user data accessed and generated during such cloud-processing sessions, a cloud service provider may implement security rules that cause a processing session to "time-out" and disconnect from the client device when the client device becomes non-responsive or is idle for a period of time.

SUMMARY

According to one implementation, a method for securely recovering a terminated client-to-cloud processing session includes transmitting an encryption key of a cloud-based server across a data link to a client device. A cloud processing session is then initiated using the data link in which session-specific data is generated. The client device is instructed by the cloud-based server to encrypt a first portion of the session-specific data using the encryption key of the cloud-based server when a session termination condition is satisfied. The method further provides for terminating the cloud-based processing session and receiving credentials of the client device in association with a request to re-initiate the terminated cloud-based processing session. If the credentials of the client device are authenticated, a decryption key of the cloud-based server is transmitted to the client device along with an instruction to utilize the decryption key to restore the encrypted first portion of the session data on the client device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other implementations are also described and recited herein.

DETAILED DESCRIPTION

Many cloud service providers implement security rules that forcibly terminate client device connections under certain circumstances. For example, a user device may be disconnected from a cloud service platform when the cloud service platform detects that the device has been idle in excess of a set time-out interval and/or during a time when the cloud platform is awaiting a particular user input. If, for example, the user minimizes a browser window that is interacting with the cloud service platform or leaves the room for a few minutes, the user may not realize the cloud platform is awaiting an input and be inadvertently disconnected from a cloud server mid-way through a client-initiated processing job.

The above-described forcible disconnect protocols may reduce a likelihood that an unauthorized user could gain access to sensitive data through an unattended client device and/or help to free up cloud processing resources for devices with jobs pending in a cloud processing queue. At the same time, the sudden termination of a client connection to a cloud processing session can be a frustrating loss of time for the user. The environmental configuration, system state, and user data that is generated during a cloud processing session, collectively referred to herein as "session-specific data," is typically not saved when a session is terminated. Saving such data to the cloud for each inactive processing session would amount to a tremendous strain on cloud storage resources. While the option exists to save session-specific data on the associated client device rather than in the cloud, this latter solution is typically viewed as unacceptable because it is difficult to ensure such data remains secure. Even if encrypted, any key stored locally on the client device could be accessed by an actor communicating with the device's operating system.

The herein disclosed technology provides solutions designed to maintain (prolong) secure client-cloud connections in circumstances where such connections would, in existing systems, be terminated. Additionally, the disclosed technology also provides solutions that allow session-specific data to be stored securely when cloud processing session is terminated either intentionally or unintentionally so that it may be quickly recovered when the session is subsequently re-initiated by a user.

Figure 1:
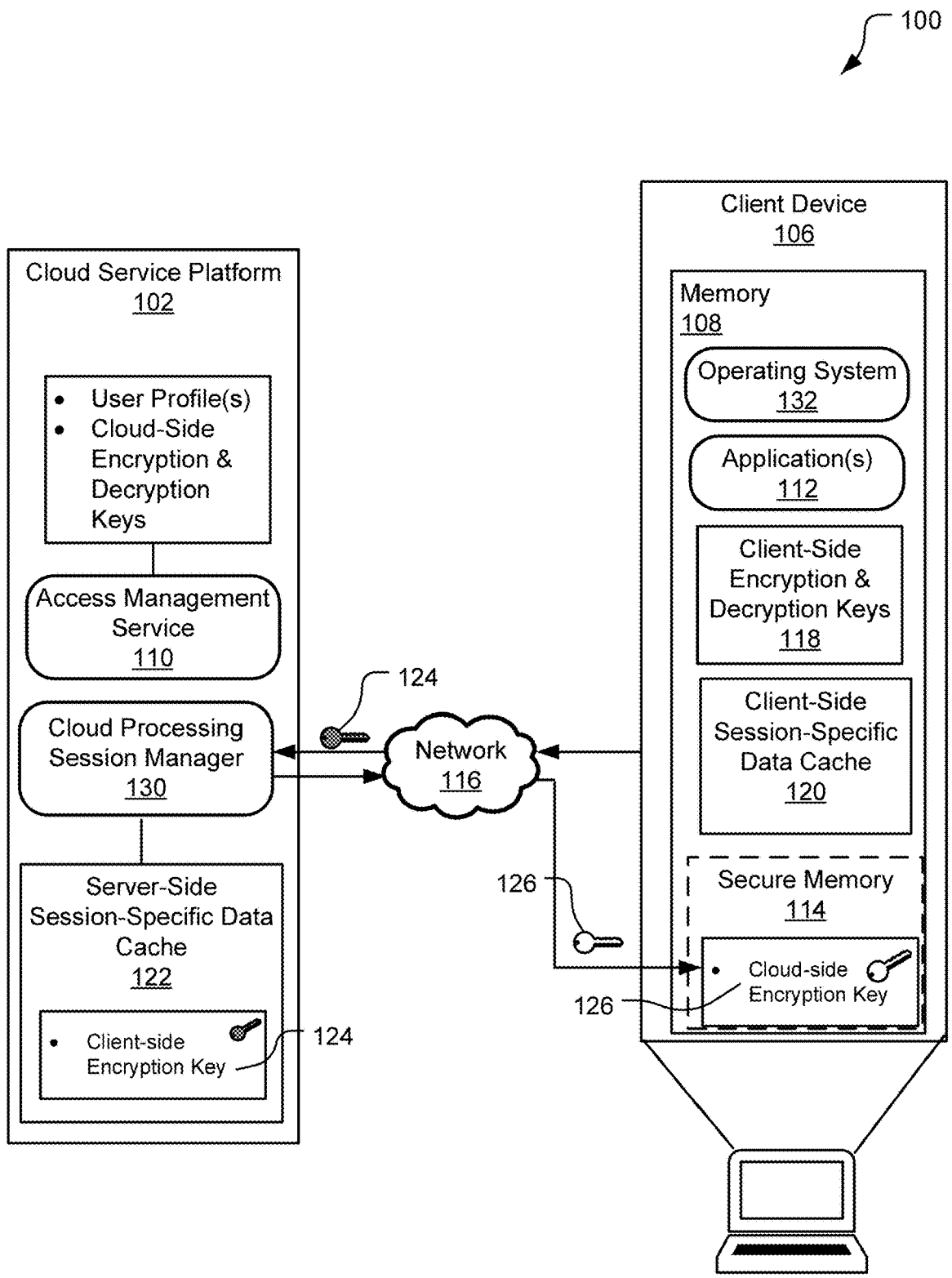
FIG. 1 illustrates an example cloud processing system that implements measures to ensure recovery of terminated cloud-to-client connections.

FIG. 1 illustrates an example cloud processing system 100 that implements measures to ensure recovery of terminated cloud-to-client connections. As used herein, a "terminated cloud processing session" refers to a cloud processing session that is terminated by a cloud server prior to completing a processing job requested by the client device. A terminated cloud processing session may in some cases be forcibly terminated by the client device, such as responsive to an explicit instruction from the client device or responsive to a user action or condition that satisfies a session termination condition (discussed elsewhere herein). In other cases, the term "terminated cloud processing session" refers to a processing session that is terminated as a result of unintentional action by a user of a client device. For example, the user may close a window expecting the session to continue next time he or she opens the window.

The cloud processing system 100 of FIG. 1 includes a cloud service platform 102 that provides processing and/or storage resources to cloud-based "tenants." By example and without limitation, a tenant to the cloud service platform 102 may be an enterprise with a number of client devices (e.g., a client device 104) that leases compute power from the cloud service platform 102 to perform various processing tasks. Example technologies that may rely on heavy compute power and therefore benefit from services of the cloud service platform 102 include big data analytics, internet-of-things (IoT) devices and solutions, artificial intelligence, and web and mobile application hosting.

The cloud service platform 102 may be implemented on one or more cloud-based servers (not shown). When a client device 106 requests a processing job, the cloud service platform 102 may initiate a processing session between the client device 106 and a select one of its cloud-based servers. The processing session may entail accessing, manipulating, and/or generating sensitive data subject to heightened security protections. Examples of sensitive data include, without limitation, company-owned proprietary information, medical records, user identity data (e.g., SSNs, address information, financial documents), and the like.

By example and without limitation, the cloud service platform 102 is shown to include an access management service 110 that is tasked with verifying the identity of each client device 106 that initiates a connection with the cloud service platform 102. For example, the client device 106 may provide login information (e.g., a username and password) for an established tenant, user, or device account of the cloud service platform 102. The access management service 110 may also store and manage various key(s) used to securely encrypt or decrypt sensitive data. Some implementations may implement asynchronous decryption, meaning that a different key or key set is used in decryption activities than in encryption activities. For example, the cloud service platform 102 may manage one or more public keys used in data encryption operations on various devices of the cloud service platform 102 as well as one or more private keys (e.g., device-specific keys) used in data decryption operations of individual devices within the cloud service platform 102.

In addition to the access management service 110, the cloud service platform 102 is also shown to include a cloud processing session manager 130, which may be understood as hardware and/or software that manages and executes processing jobs associated with processing requests submitted by the client device 106.

The client device 106 may be understood as any client-owned processing device configured to communicate with the cloud service platform 102 over a network 116 (e.g., the internet). The client device 106 includes memory 108 storing an operating system 132 and various applications 112. The memory 108 may also store data used to establish each cloud processing session or otherwise facilitate cloud processing operations performed by the cloud service platform 102. By example and without limitation, the memory 108 of the client device 106 is shown to include client-side encryption and decryption keys 118.

For each cloud processing session conducted by the cloud service platform 102 on behalf of the client device 106, session-specific data is generated (e.g., retrieved and/or computed) and temporarily stored in relation to the session. In the illustrated implementation, session-specific data associated with a single cloud processing session is divided into two portions that are stored separate from one another. While the session is active, first portion of the session-specific data is locally stored on the client device 106 in a client-side session-specific data cache 120 while a second (different) portion of the session-specific data is stored in a server-side session-specific data cache 122, which resides, for example, on the server of the cloud service platform 102 that is hosting the cloud processing session with the client device 106. In another implementation, all session-specific data is stored on the server-side (e.g., in the server-side session-specific data cache 122) while the session is active and transferred to the client device 106 upon session termination. In still yet another implementation, the session-specific data is written primarily or exclusively to the client-side and retained on the client side following session termination.

If the cloud processing session between the client device 106 and the cloud service platform 102 is interrupted (e.g., terminated), cloud session data associated with the terminated session is retained in a secure manner such that the data can be potentially recovered when the cloud processing session is subsequently re-initiated. The various implementations disclosed herein provide storage solutions for the session-specific data that allow for the recovery of the session-specific data such that a terminated cloud processing session may be restored from a last-saved point.

In one implementation, session-specific data is encrypted upon termination of the associated cloud processing session and stored in its encrypted form in same client-side and server-side cache locations where the data is initially placed during the active session. In another implementation, session-specific data residing on the server-side is, upon session termination, encrypted and transmitted in its encrypted form to the client device 106. In either implementation, some session data is stored on the client device 106 following session termination. Storing some or all of the session-specific data on the client device 106 in this manner significantly reduces the strain on cloud storage resources.

As mentioned above, FIG. 1 illustrates an implementation where the session-specific data is split into two portions stored in different locations. A first portion of the session-specific data is stored on the client device 106 in the client-side session-specific data cache 120 while a second portion of the session-specific data is stored in the server-side session-specific data cache 122 on the cloud-based server of the cloud service platform 102.

At some point during initiation or active processing of the cloud-processing session, the client device 106 and cloud-based server exchange encryption keys—e.g., a client-side encryption key 124 is transmitted to the cloud service platform 102 and a cloud-side encryption key 126 is transmitted to the client device 106. This exchange of encryption keys may, for example, occur at the start of a cloud-processing session. Notably, some implementations of the disclosed technology do not provide for exchanging any keys between the client device 106 and the cloud service platform 102. A detailed example of this alternative implementation is discussed below with respect to FIG. 5.

By example and without limitation, FIG. 1 illustrates the cloud-side encryption key 126 being stored in a secure memory region 114. The secure memory region 114 may, for example, be a memory storage region that is not accessible to the operating system 132 of the client device 106 and that is securely accessible, via a negotiation process, to an entity such as a cloud-based server. An example of a secure memory storage region consistent with the above description and the implementation of this technology is described in U.S. patent application Ser. No. 17/104,311, filed on Nov. 25, 2020, which is hereby incorporated by reference for all that it discloses or teaches. When the client device 106 stores the cloud-side encryption key 126 in the secure memory 114 (as in the implementation of FIG. 1), the cloud-side encryption key 126 is not accessible to the operating system 132 of the client device 106 or to any of the applications 112 locally-executed by the client device 106. Consequently, the cloud-side encryption key 126 cannot be accessed by third-party devices communicating with the operating system 132 of the client device 106. By storing the cloud-side encryption key 126 in the secure memory 114, the client device 106 is able to utilize the cloud-side encryption key 126 to encrypt data stored in the client-side session-specific data cache 120 without exposing the cloud-side encryption key 126 to the operating system 132 or other modules vulnerable to outside attack or infiltration. In other implementations, the client device 106 stores the cloud-side encryption key 126 in the same physical memory as the client-side session-specific data cache 120 or in some other separate physical memory.

When the data link between the cloud service platform 102 and the client device 106 is terminated, the cloud-processing session manager 130 transmits an instruction to the client device 106 requesting the device to use the cloud-side encryption key 126 to encrypt data residing in the client-side session-specific data cache 120. If, at session termination, some of the session-specific data also resides on the cloud-based server (e.g., in the server-side session-specific data cache 122), the cloud service platform 102 may use the previously-received client-side encryption key 124 to encrypt this data. In one implementation, the client device 106 deletes the cloud-side encryption key 126 following the encryption of the data within the client-side session-specific data cache 120. Likewise, the cloud service platform 102 may delete the client-side encryption key 124 following its use to encrypt the data residing in the server-side session-specific data cache 122. By using each other's encryption keys to encrypt locally-stored session data and then deleting such keys, each of the client device 106 and the cloud service platform 102 are able to ensure that their respectively-stored portions of the encrypted cloud session data are secure from third-party infiltration.

If and when a user of the client device 106 chooses to reinitialize the session, the cloud service platform 102 and client device 106 may, at such time and under certain secure circumstances, exchange decryption keys and use each other's decryption keys to decrypt the stored data. This process is described below in greater detail with respect to FIG. 2-4. Notably, FIG. 5 illustrates an alternative approach that similarly facilitates secure recovery of terminated cloud processing sessions but without requiring an exchange of any encryption/decryption keys between the client device 106 and the cloud service platform 102.

Figure 2:
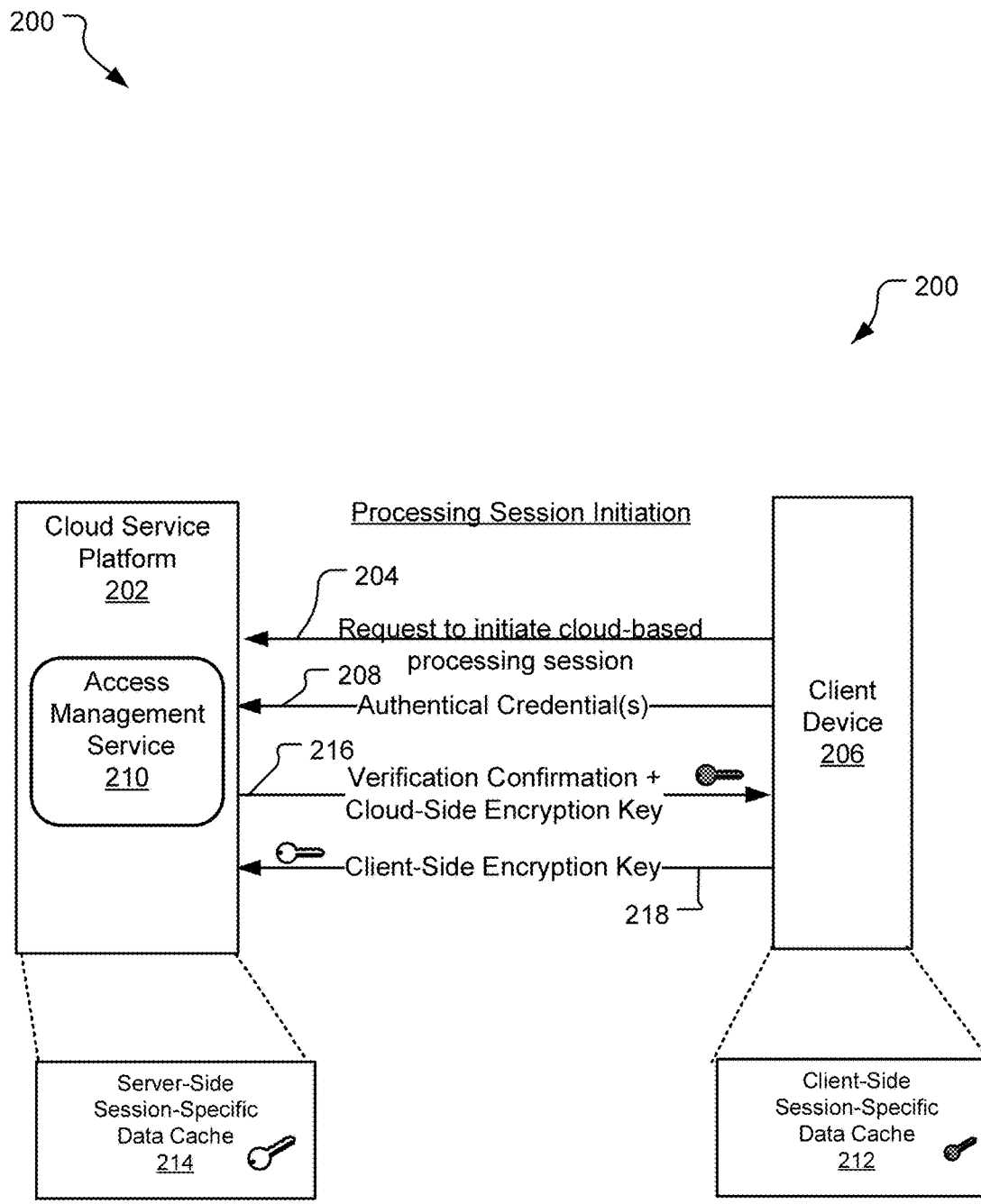
FIG. 2 illustrates example bidirectional communications performed to establish a client-to-cloud connection in an example cloud processing system.

FIG. 2 illustrates example bidirectional communications performed to establish a client-to-cloud connection in an example cloud processing system 200. The cloud processing system 200 includes a cloud service platform 202 that performs processing operations on behalf of a client device 206 (e.g., a tenant device of the cloud service platform). In an initial communication 204, the client device 206 transmits the cloud service platform 202 a request to initiate a cloud-based processing session. This request may, for example, include processing job specifics such as quer(ies) to one or more databases, calls to cloud-stored processing modules, etc.

In addition to transmitting the initial request to initiate the cloud-based session, the client device 206 also transmits authentication credentials in a communication 208, which may for example include user or device log-in information for an account established with the cloud service platform 202. An access management service 210 on the cloud service platform 202 verifies the received authentication credentials and may, at this time, select a cloud-based server within the cloud service platform 202 to handle the request. The selected cloud-based server then, in turn, transmits a communication 216 back to the client device 206 that includes a verification confirmation along with a cloud-side encryption key (e.g., a public encryption key of the cloud service platform 202). In at least one implementation, the client device 206 stores this cloud-side encryption key locally in a secure memory region that is not accessible to an operating system of the client device 206.

The client device 206 sends its own encryption key back to the cloud service platform 202 in a communication 218. Following this exchange of encryption keys, the cloud-based server begins performing the processing operation(s) requested by the client device 206, generating session-specific data throughout the ongoing operation. As this session-specific data is created, each portion of the data is stored in a select one of a client-side session-specific data cache 212 on the client device 206 or a server-side session-specific data cache 214 on the cloud service platform 202.

Figure 3:
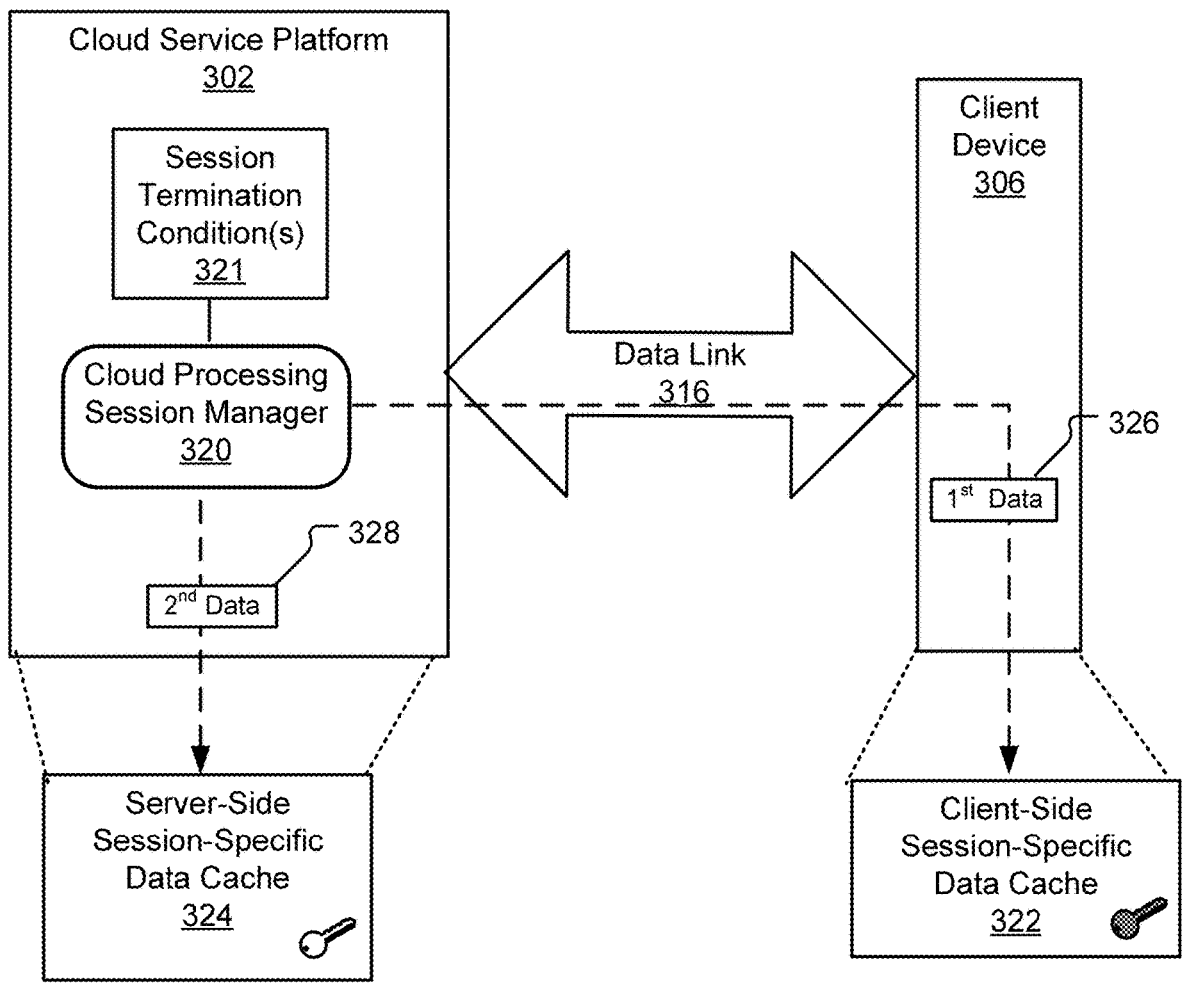
FIG. 3 illustrates further example aspects of a system that provides secure recovery and restoration of terminated cloud processing sessions.

FIG. 3 illustrates further example aspects of a system 300 that provides secure recovery and restoration of terminated cloud processing sessions. Specifically, FIG. 3 illustrates a data link 316 that has been established between a client device 306 and a cloud service platform 302 to facilitate execution of a processing job by the cloud service platform 302 on behalf of the client device 306, such as according to the operations shown and described with respect to FIG. 2. At the time the data link 316 is initially established, the client device 306 and the cloud service platform 302 exchange encryption keys.

The cloud service platform 302 includes a cloud processing session manager 320 that manages execution of the processing job requested by the client device 306. During the cloud processing session, session-specific data is generated and stored temporarily in one of two storage locations located on different devices. The cloud processing session manger 320 directs a first portion 326 of session-specific data across the data link 316 to be stored in a client-side session-specific data cache 322 of the client device 306 while directing a second portion 328 of the session-specific data to a server-side session-specific data cache 324 of the cloud service platform 302.

The specific types of data stored within each of the client-side session-specific data cache 322 and the server-side session-specific data cache 324 may vary in different implementations. In one implementation, the server-side stores the variables and configuration data that is usable to hold the state of the session (e.g., temporary variables) in addition to intermediate action results such as query responses, tokens, etc. The client, in contrast, may store client state variables (e.g., caches of web service files and their associated temporary variables, including intermediate values). If, for example, the sessions-specific data includes a web document that the user is editing, then the server may store the entire document in its temporal memory while the client side stores a particular page that the user is currently editing.

Throughout the duration of the cloud processing session with the client device 306, the cloud processing session manager 320 may be tasked with monitoring and evaluating satisfaction of one or more predefined session termination conditions 321, which may be understood as security rules that, when violated, result in forcible termination of the data link 316.

In one implementation, the session termination conditions 321 provide for termination of the data link 316 when the client device 306 remains idle for a period of time satisfying a predefined threshold. For example, the data link 316 may be terminated if the cloud processing session manager 320 requests information from the client device 306 and does not receive a response within a defined time-out interval. Likewise, the cloud processing session manager 320 may, in some implementations, attempt to reauthenticate a user of the client device 306 such as by re-requesting security credentials or otherwise attempting to obtain fresh security credentials. In one implementation, the data link 316 is selectively terminated by the cloud processing session manager 320 if the client device 306 fails to provide correct authentication credentials during the reauthentication attempt.

When the cloud processing session manager 320 determines that one of the session termination conditions 321 is satisfied, the cloud processing session manager 320 forcibly terminates the data link 316 and the devices at each end of the data link 316 encrypt the associated locally-stored session-specific data using the encryption key obtained from the device at the other end of the data link 316. In one implementation, a server of the cloud service platform 302 uses a client-side encryption key to encrypt session-specific data stored in the server-side session-specific data cache 324 while the client device 306 utilizes a cloud-side encryption key to encrypt session-specific data stored in the client-side session-specific data cache 322. In other implementations, the keys used to perform encryption on one or both sides of the session are locally-generated and maintained session-specific keys.

In one implementation, the client device 306 stores the server-side encryption key (e.g., the key previously obtained from the server of the cloud-based platform) in a secure memory location where it cannot be accessed by the operating system of the client device 306. For example, one or more encryption modules may reside within the secure memory region and be configured to execute encryption operations associated with the cloud processing session without involving an operating system or any application stored in main memory of the client device. Following the encryption activities performed by each of the cloud service platform 302 and the client device 306, the first portion 326 of the session-specific data remains stored, in encrypted form, within the client-side session-specific data cache 322 while the second portion 328 of the session-specific data remains stored, in encrypted form, within the server-side session-specific data cache 324. In another implementation, all session-specific data is stored on the client-side and encrypted on the client-side (rather than being divided into two portions separately stored and encrypted). Even in this implementation, other operations described above with respect to FIG. 3 may remain the same or similar.

Figure 4:
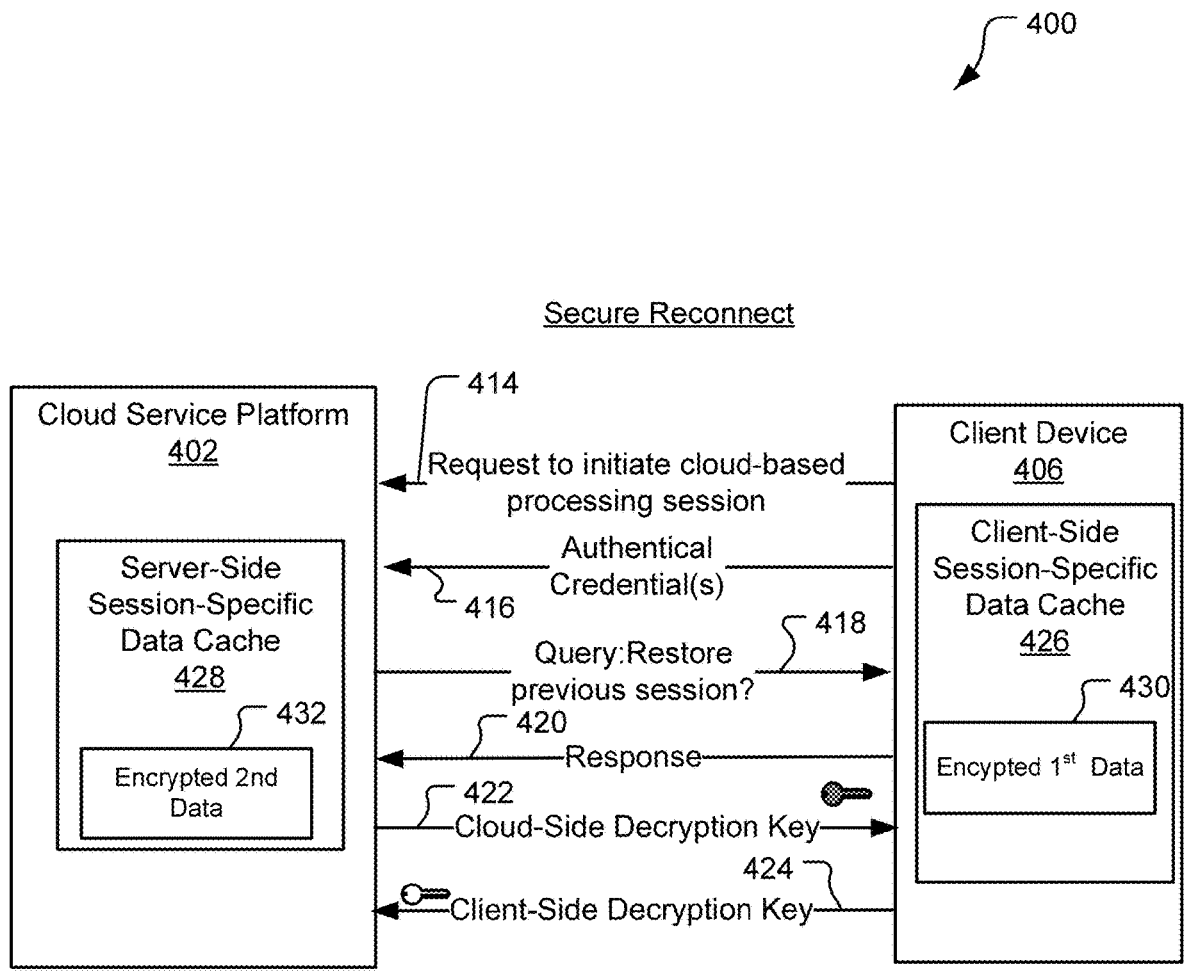
FIG. 4 illustrates aspects of another example system that provides secure recovery and restoration of terminated cloud processing sessions.
Figure 5:
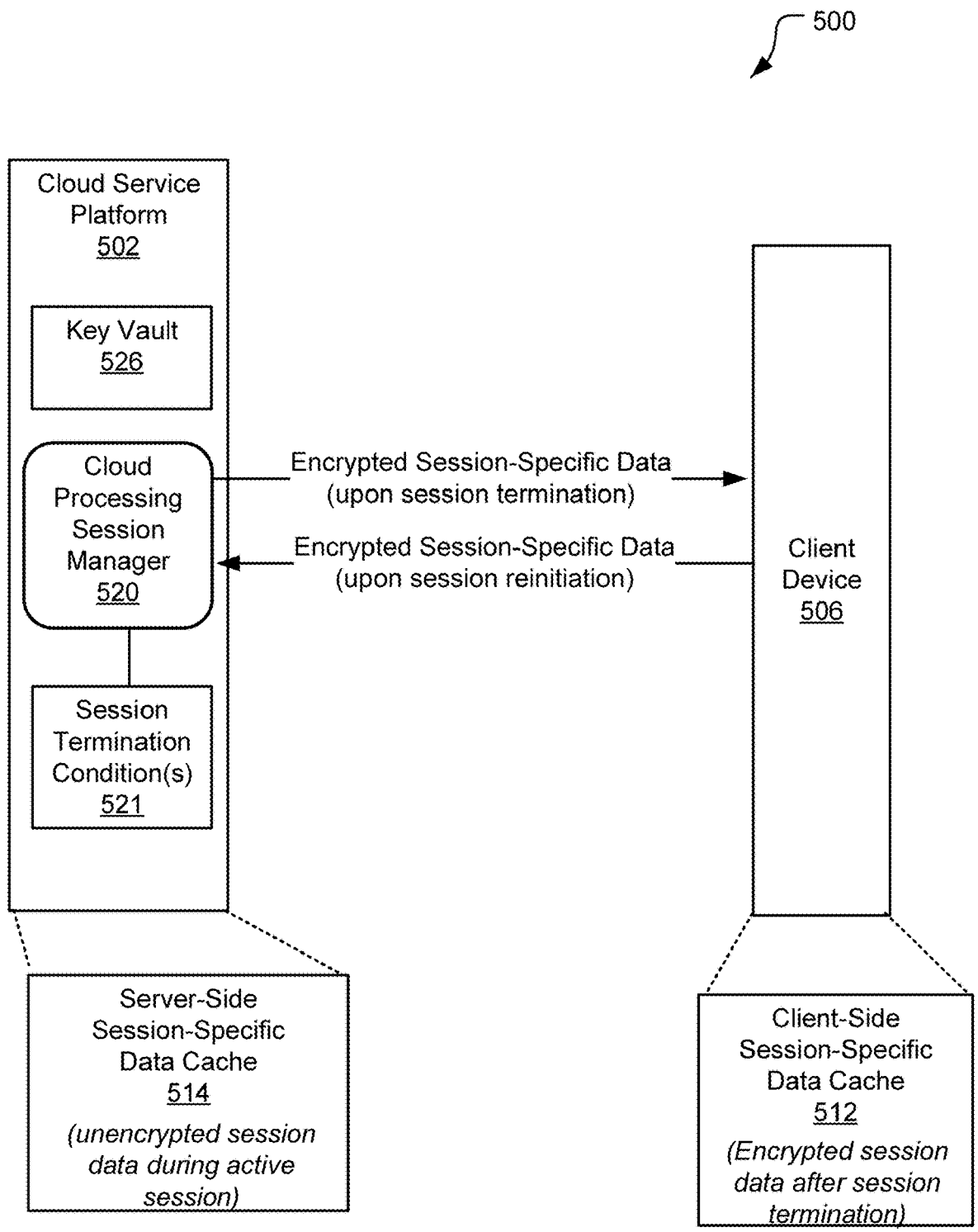
FIG. 5 illustrates another example system that provides secure recovery and restoration of terminated cloud processing sessions.

FIG. 4 illustrates an example system 400 that provides secure recovery and restoration of terminated cloud processing sessions. Specifically, FIG. 4 illustrates example operations performed following forcible termination of a data link between a cloud service platform 402 and a client device 406, such as in the manner described above with respect to FIG. 3. After the cloud processing session is forcibly terminated, session-specific data resides in encrypted form in the client-side session-specific data cache 426 on the client device 406. In one implementation, all of the session-specific data resides here (on the client side). In another implementation, at least a first portion of the session-specific data resides in encrypted form on the server-side (in a server-side session-specific data cache 428) while a second portion of the session-specific data resides in encrypted form on the client-side (in the client-side session-specific data cache 426). FIG. 4 illustrates this latter case, where the session-specific data is stored as two separate portions represented as encrypted first data 430 and encrypted second data 432.

Following forcible termination of the data link between the cloud service platform 402 and the client device 406, a user of the client device 406 may request to restore the previous cloud processing session after receiving input from a user (e.g., upon realizing that the cloud processing session did not complete successfully). In this case, the client device 406 transmits a new communication 414 to the cloud service platform 402 including a request to initiate a cloud processing session. The request may, in some implementations, include requested job specifics identical to those requested when the previous session (now terminated) was initially established. In the same or another communication 416, the client device 406 also provides authentication credentials, such as user or device account information (e.g., a username and password for the cloud service platform 402). An access management service 410 on the cloud service platform 402 verifies the received authentication credentials and, responsive to successful verification of the validity of the authentication credentials, transmits a communication 418 that asks the client device 406 whether or not to restore the previous (terminated) session. For example, the client device 406 may present the user with a prompt such as "Do you want to recover your last session?" The user provides a response 420 that is sent back to the cloud service platform 402.

Provided the response 420 indicates that user does want to recover the previous session, the cloud service platform 402 transmits a cloud-side decryption key 422 to the client device 406 and the client device 406 transmits a client-side decryption key 424 to the cloud service platform 402. The cloud-side decryption key 422 and the client-side decryption key 424 are, in one implementation, different from the keys used to encrypt the encrypted first data 430 and the encrypted second data 432 of the previous session. For example, the cloud service platform and the client device 406 may initially exchange one pair of keys used for data encryption (e.g., as described with respect to FIG. 2) and then subsequently exchange a different pair of keys used for data decryption. This use of different encryption/decryption key pairs is commonly referred to as asynchronous encryption.

After this exchange of decryption keys, the client device 406 uses the cloud-side decryption key 422 to decrypt the encrypted first data 430 residing a client-side session-specific data cache 426. The cloud service platform 402 uses the client-side decryption key 424 to decrypt the encrypted second data 432 residing in a server-side session-specific data cache 428. Using this decrypted data, the previous cloud processing session is then restored from the last-saved point in time (e.g., the exact point at which it terminated) with no data being lost or in need of recovery.

FIG. 5 illustrates another example system 500 that provides secure recovery and restoration of terminated cloud processing sessions. FIG. 5 has many of the same elements as the systems in FIG. 1-4, but implements somewhat different methods for encryption and data storage. The system includes cloud service platform 502 including a cloud processing session manager 520 that manages aspects of a cloud-processing session between the cloud service platform 502 and a client device 506. During an active cloud-processing session, session-specific data is written to a cache on the server-side of the connection (e.g., to server-side session-specific data cache 514). In one implementation, some data of the active cloud processing session is also written to a cache on the client side (e.g., client-side session-specific data cache 512); other implementations may not store any of the session data on the client device 506 until after the session is terminated.

When a session termination condition 521 is satisfied, the cloud processing session manager 520 terminates the active session with the client device 506 and locally encrypts its portion of the session-specific data using a select server-side key stored in a key vault 526. The select server-side key may be, for example, a generic private key or a session-specific key that is, in one implementation, generated based on a generic private key. If any session specific data is stored on the client device 506, the cloud processing session manager 520 instructs the client device to locally encrypt such data, such as using key(s) that are owned by and maintained on the client device 506.

In one implementation, the key vault 526 on the cloud service platform 502 stores a table of session-specific keys for each different active and inactive (terminated) cloud processing session. For example, a table within the key vault 526 may store the session-specific key for each terminated and/or active session in association with identifying information for the associated client device (e.g., system authentication credentials, MAC id, IP address). In another implementation, session-specific keys for terminated sessions are not stored on the cloud service platform 502. Rather, each session-specific key for a terminated session is stored on the associated client device for which the session was conducted. For example, the session-specific key for a particular session with the client device 506 may be encrypted on the cloud service platform and, upon session termination, transmitted to the client device 506 associated with the terminated session. This latter approach conserves storage resources of the cloud service platform 502 by eliminating the need for the cloud processing session manager 520 to store and track the session-specific keys for all terminated cloud processing sessions.

Once the cloud processing session is terminated and the session-specific data is encrypted on the server side, the encrypted session specific data is transmitted to the client device 506 and stored within the client-side session-specific data cache 512. In one implementation, this encrypted data resides exclusively on the client device 506 in the client-side session-specific data cache 512 until such time that a user provides the cloud service platform 502 with a request to reinitiate the former terminated session, such as by opening a window, clicking a prompt, etc. Storing all session-specific data on the client device 506 after it has been securely encrypted minimizes the strain on cloud storage resources as a result of preserving such data. Moreover, encrypting the server-side portion of the session-specific data on the cloud service platform 502 allows the data to remain secure once transferred to the client-side session-specific data cache 512 because the client device 506 does not have access to unencrypted key(s) needed to decrypt such data.

Notably, some implementations may provide for transfer of encrypted session-specific keys to the client-side session-specific data cache 512 following termination of the associated session.

Upon successful reconnection of the terminated session, the client device 506 transfers the encrypted session-specific data back to the server-side session-specific data cache 514 along with the encrypted session-specific key (e.g., if such encrypted key is stored on the client device 506 for the terminated session). Upon receipt of such information, the cloud processing session manager decrypts the session-specific key and uses the session-specific key to decrypt the received session-specific data, essentially restoring the data and allowing the cloud processing session to resume from a last-saved point in time.

Figure 6:
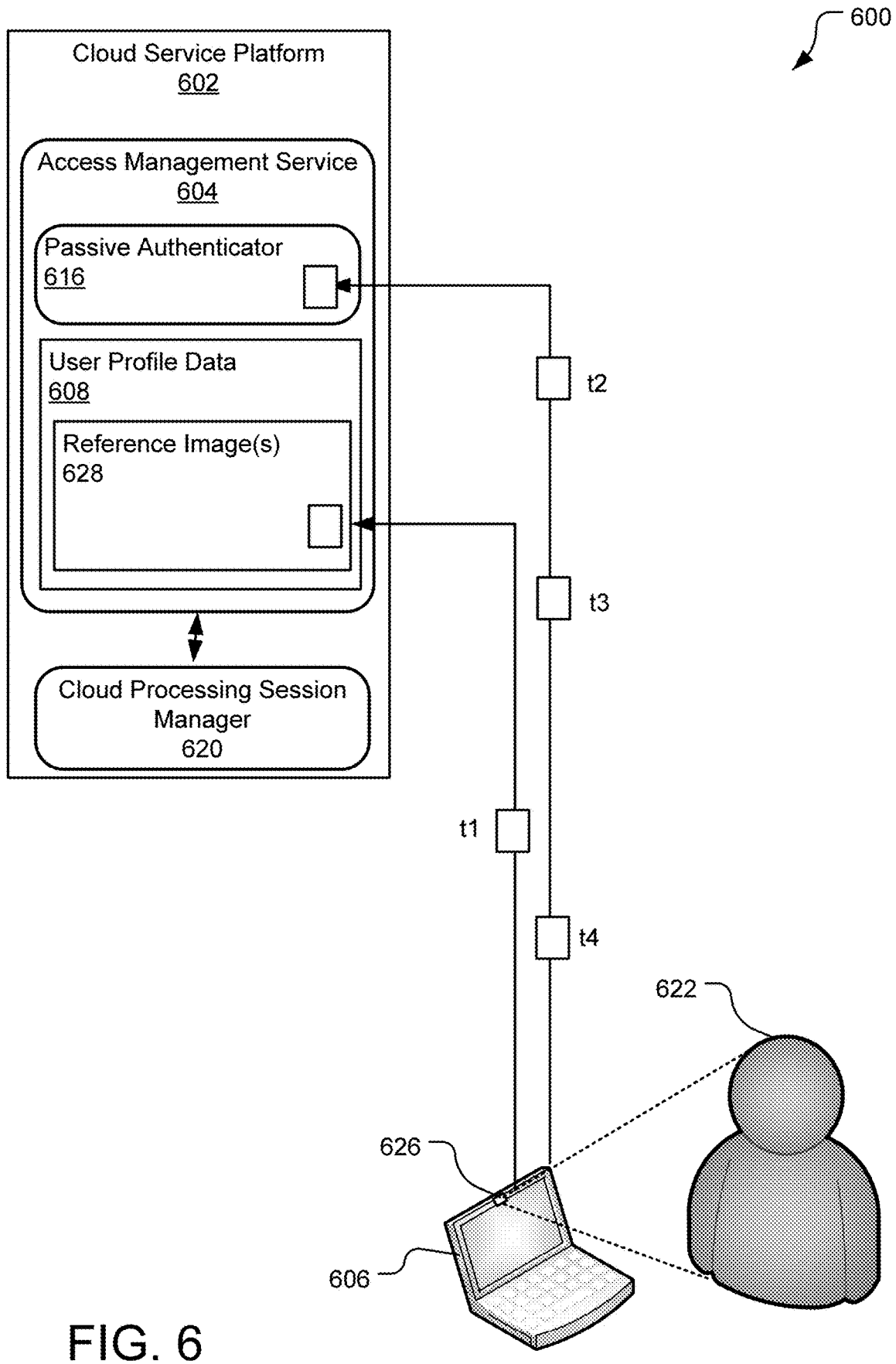
FIG. 6 illustrates exemplary aspects of a cloud processing system that performs actions to help maintain client-to-cloud connections without compromising security.

FIG. 6 illustrates exemplary aspects of a cloud processing system 600 that performs actions to help maintain client-to-cloud connections without compromising security. As discussed above, a variety of cloud processing platforms implement security rules ("session termination conditions") that impose conditions under which client-to-cloud connections may be forcibly terminated, such as when client device is idle for a time period in excess of set time-out interval, when the user does not respond as expected to a particular prompt generated by the cloud processing session, or when the user is prompted for authentication credentials but provides an invalid password or username. In many cases, these security protocols provide for forcible termination of a cloud connection when there is no legitimate security risk. For example, the user may have minimized a window with information associated with the cloud processing system (e.g., causing the user to inadvertently fail to a prompt from the system), mistyped login information, or stepped out of the room momentarily causing the session to time-out or reach prompt the user for information while the user is not there. The could processing system 600 of FIG. 6 implements additional security measures that allow for a decrease in the number of these forcibly-terminated cloud processing sessions without increasing the risk of misappropriation of user data.

In FIG. 6, a cloud service platform 602 is shown to include an access management service 604. Both the cloud service platform 602 and the access management service 604 may be configured to perform the same or similar operations as like-named components described with respect to other figures. For example, the access management service 604 may receive a set of credentials (e.g., a username and password) from a client device 606 that has initiated a cloud processing session. The access management service 604 may then attempt to authenticate the received credentials by way of a comparison to stored information (e.g., user profile data 608). Responsive to successful verification of the user-provided credentials, a cloud processing session manager 620 initiates the cloud processing session with the client device 606 and begins to execute the client-requested processing job(s).

In addition to performing the functions described above, the access management service 604 includes a passive authenticator 616 that uses passively-obtained authentication information to periodically, or responsive to certain trigger events, re-authenticate the client device 606, such as to confirm the user of the client device 506 has the authority to access data retrieved or generated as part of the session-specific data. As used herein, "passively-obtained authentication information" refers to authentication information that is obtained without any affirmative action on behalf of the user. For example, the user does not have to type, click, respond to a prompt, or provide other inputs.

In one implementation, the passive authenticator 616 uses biometric data, captured by one or more sensors (such as a camera 626) on the client device 606 to periodically "re-authenticate" a user 622—meaning, to verify that the person operating the client device 506 is indeed an individual who is authorized to access the cloud service platform account currently being used to conduct the ongoing cloud processing session. For example, the passive authenticator 616 may use the camera(s) 626 to capture a biometric signature of the user 622 and compare the captured biometric signature of the user 622 with one or more previously-captured, stored biometric signatures 628. As used herein, the term "biometric signatures" may refer to any biometric data captured usable to confirm user identity including without limitation photographic facial images, fingerprints, retinal scan images, heat signatures etc. Biometric signatures are use-specific and—unlike a password—cannot be easily "hacked" by guessing or other means. Each newly-captured biometric signature of the user is compared to as stored (reference) biometric signature 628 of the same type to assess satisfaction of a similarity condition (e.g., threshold degree of similarity).

In one implementation, the above-described passive re-authentication is performed by comparing a newly-captured biometric signature of the user 622 to one or more reference biometric signatures(s) 628 of the user 622 that were captured earlier but during the same cloud processing session. For example, the passive authenticator 616 may instruct the client device 606 to use a camera 626 to capture a "fresh" reference biometric signature (e.g., an image) of the user 622 at the start of each new cloud processing session such as responsive to or concurrent with an initial verification of user account credentials. This image captured at the start of the cloud processing session may be stored within the user profile data 608 and used as a reference biometric signature 568 against which other images, captured during the same cloud processing session, are compared to effectively "re-authenticate" the user 620 at one or more times during the active cloud processing session.

In FIG. 6, the reference biometric signature 628 is shown captured at time (t1), which may be understood as being at or near the time that the cloud processing session is initiated. Additional biometric signatures of the user 622 are captured at regular intervals coinciding with times t2, t3, t4 (e.g., as shown). Upon capture of each additional biometric signature of the user 622, the passive authenticator 616 compares the newly-captured biometric signature with the reference biometric signature 628. If a similarity condition is satisfied with a threshold degree of confidence, no further action is taken. If, however, the reference image and one of the newly-sampled images fail to satisfy the similarity condition, the access management service 604 may instruct the cloud processing session manager 620 to forcibly terminate the cloud processing session.

The recapture of biometric signatures of the user 622 at predefined intervals throughout the cloud processing session is merely exemplary. In other implementations, the cloud processing system 600 may perform a passive reauthentication attempt responsive to certain predefined events such as system events (e.g., whenever the cloud processing system prompts the user 622 for an input) or events detected in relation to an environment of the user 622 (e.g., whenever a motion detection subsystem senses a user moving out of and back into a frame of the camera 626).

The use of a relatively recent reference biometric signature (e.g., an image captured during the same cloud processing session as the one in which it is used for authentication purposes) allows the cloud processing system 600 to enforce tighter similarity constraints than most photographic authentication processes. If, for example, both the reference biometric signature(s) 628 and the comparison biometric signatures are captured during the same processing session, the similarity condition computed can depend upon dynamic features of the users' appearance that change day to day. If the biometric signatures are photographic, this approach may, for example, allow the system to answer questions such as: does the user have the same hairstyle in both photos? Has the user's facial hair changed? Is the user wearing the same clothing? The use of these more dynamic features for biometric signature authentication may help to ensure that an imposter does not merely find a way to use an older biometric signature of the user 622 (e.g., an old photo) to gain access to the user's account on the cloud service platform 602. Likewise, it may help to reduce the rate of false positive matches identified as compared to image authentication procedures based at least in part on facial features (e.g., facial proportions) alone.

In one implementation, the passive authenticator 616 is capable of performing passive authentication with respect to multiple users simultaneously present in a field-of-view of the camera 626 of the client device 606. For example, the passive authenticator 616 may detect multiple individuals in an initially-capture reference image, parse multiple sub-images from the reference image (e.g., where each of the sub-images includes a detected one of the users), and collectively utilize the sub-images for re-authentication operations performed throughout the duration of the cloud processing session. In this case, each subsequent "fresh" image capture may be subjected to a process in which (1) the image is parsed into sub-images each including a different detected user; and (2) each sub-image is compared to each one of the reference image(s) (e.g., each of the biometric signatures 628) to confirm that all users in the "fresh" image were present in the reference image and/or are otherwise identifiable as authorized to access the account associated with the active cloud processing session.

The use of the above-described passive reauthentication techniques may help to maintain cloud connections in certain scenarios that do not pose security risks but that would, in other existing systems, prompt the cloud service platform to forcefully terminate a client-to-cloud connection. For instance, security risks may be deemed minimal when it can be confirmed that the same user is still seated at the client device 606 while the client device 606 is idle or unresponsive for some reason or when it can be determined that the user 622 has momentarily left the room but no other users are imaged within the field-of-view of the camera 626. Performing this verification passively (without input from the user) ensures that the authentication will not fail simply because the user is not present or paying attention to a particular application window. Consequently, fewer total client-to-cloud connections are forcefully terminated. This increases system efficiencies by allowing certain cloud processing jobs to complete that would otherwise be forcefully terminated and subsequently re-started, without introducing a corresponding increase in relative security risk.

Figure 7:
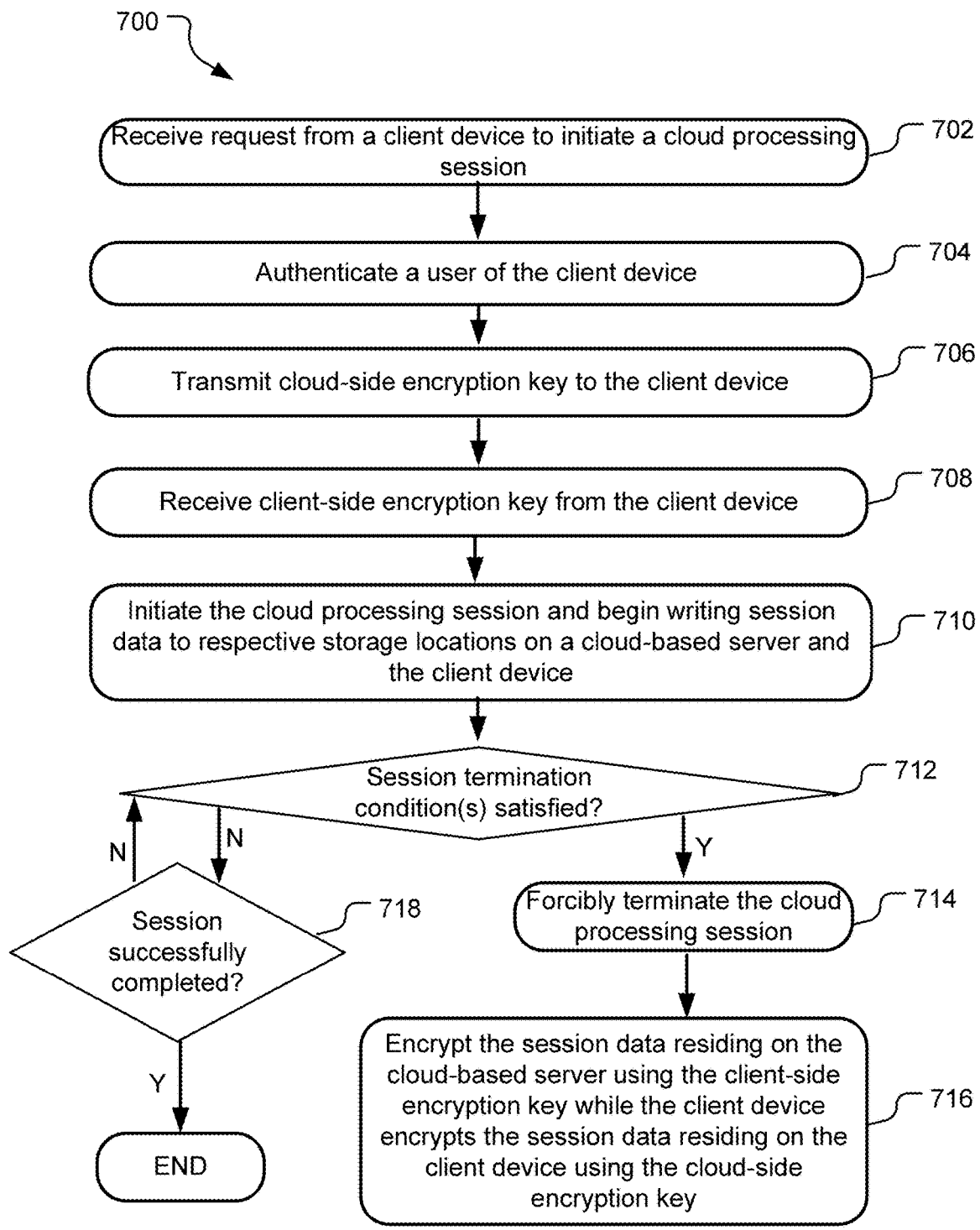
FIG. 7 illustrates example operations for securely extending cloud connections during cloud-based processing sessions and for securely recovering such connections when forcibly terminated.

FIG. 7 illustrates example operations 700 for securely extending cloud connections during cloud-based processing sessions and for securely recovering such connections when forcibly terminated. A first receiving operation 702 receives, at a cloud-based sever, a request from a client device to initiate a cloud processing session. An authentication operation 704 authenticates the client device and/or user of the client device by confirming that either the device or user is authorized to access an account associated with the requested cloud processing session. For example, the cloud-based server may transmit a query to the client device prompting a user for login credentials to a verified account with the cloud processing system. Alternatively, the cloud-based server may request other identifying credential, such as a secure signature of the client device or of one or more applications operating on the client device.

Responsive to authenticating the received credential(s) via the authentication operation 704, a transmission operation 706 transmits a cloud-side encryption key from the cloud-based server to the client device. In one implementation, the cloud-side encryption key is transmitted along with an instruction to the client device to use the encryption key to encrypt certain specified session data if and when the cloud processing session is terminated prior to successful completion. A receiving operation 708 receives, at the cloud-based server, a client side encryption key from the client device.

Following the above-described exchange of encryption keys, a session initiation operation 710 initiates the cloud processing session, begins executing one or more user-requested processing jobs associated with the request, and beings writing session data (e.g., data retrieved or generated during execution of the cloud processing session) to one of two designated storage locations—one storage location (e.g., a cache) on the cloud-based server and another on the client device. In this way, a first portion of the session data is stored on the cloud-based server and a second portion of the session data is stored on the client device. In some implementations, the session-specific data is not divided into separately stored portions and is all written to the client device.

A monitoring and determination operation 712 continuously monitors security parameters of the cloud processing session to determine if one or more predefined session termination conditions have been satisfied. In one implementation, the cloud-based server performs one or more passive authentication attempts during the active cloud processing session, such as in the manner described with respect to FIG. 6. For example the cloud-based server attempts to "re-verify" the identity of a user of the client device or otherwise confirm that the current user of the client device is the same user as the user that initiated the cloud processing session. As explained above, a "passive authentication" operation is an authentication operation performed without any affirmative action on the part of the user. If the passive authentication attempts fails, this failure may suffice to satisfy one of the predefined session termination conditions.

Notably, the monitoring and determination operation 712 may, in some implementations, monitor satisfaction of session termination conditions that do not depend on passive authentication operations. For example, the cloud-based server may monitor a period of time in which the client device has been idle and/or determine whether the cloud-based server has been awaiting a response from the client device for a period of time in excess of a defined time interval.

Responsive to satisfaction of any one of the above exemplary session termination conditions or other predefined conditions different from those provided herein, a termination operation 714 forcibly terminates the cloud processing session, and an encryption operation 716 encrypts a first portion of the session data residing on the cloud-based server using the client-side encryption key. Responsive to the termination of the session, the client device also encrypts a second different portion of the session data residing on the client device using the cloud-side encryption key. Stated differently, the client device and the cloud-based server utilize one another's keys to securely encrypt locally stored session data if and when the cloud processing session is forcibly terminated.

If the determination operation 712 determines that no session termination condition is satisfied, another determination operation 718 determines whether the cloud processing session has yet successfully completed (e.g., is still ongoing). If not, the monitoring and determination operation 712 is repeated until such time that one of the session termination conditions is satisfied or the session successfully completes.

Figure 8:
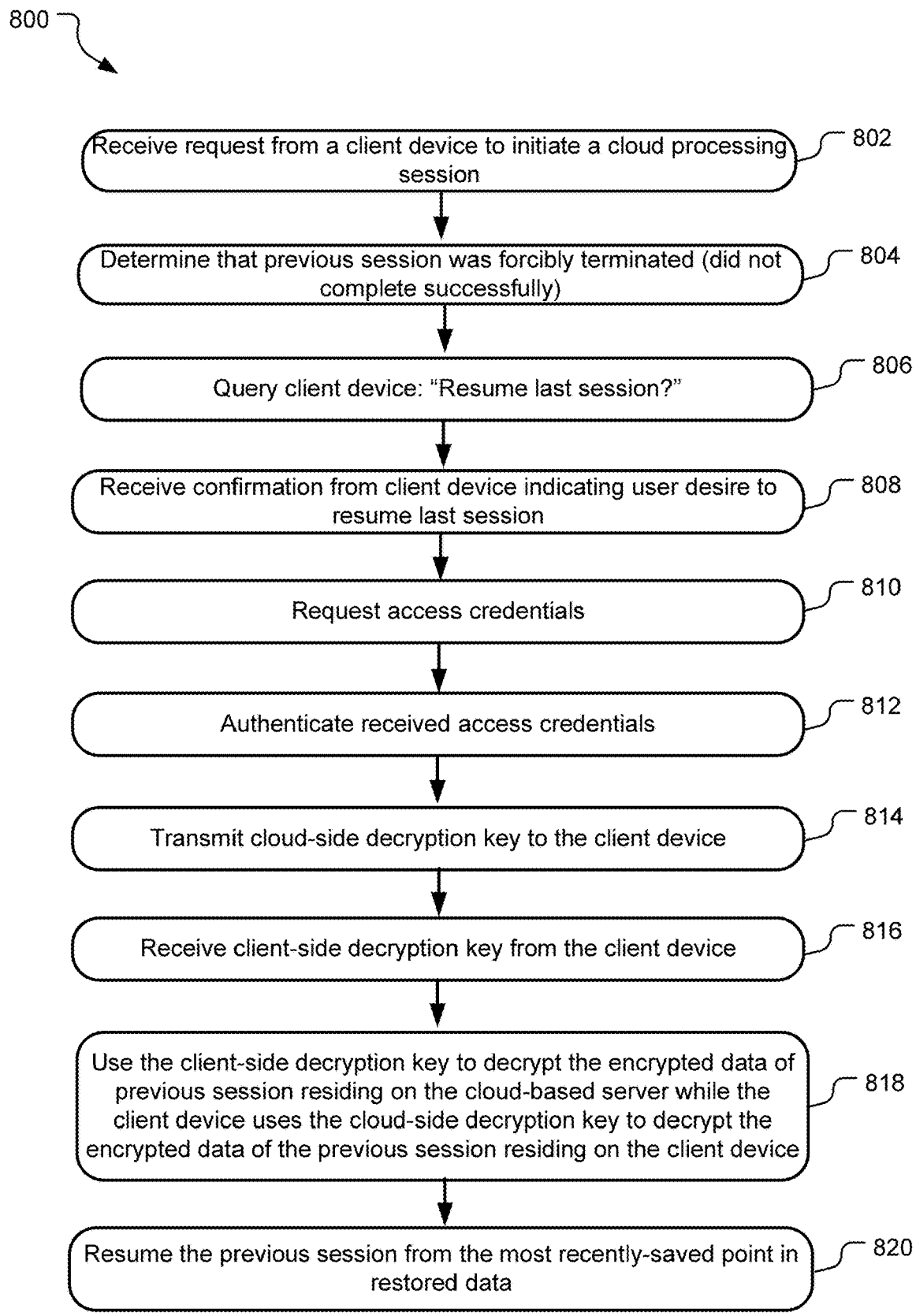
FIG. 8 illustrates further example operations for securely recovering session data of forcibly terminated cloud processing sessions.

FIG. 8 illustrates further example operations 800 for securely recovering session data of forcibly terminated cloud processing sessions. In one implementation, the operations 800 of FIG. 8 are performed following the operations 700 of FIG. 7. A receiving operation 802 receives, at a cloud-based server, a request from a client device to initiate a cloud processing session. A determination operation 804 determines that a recent cloud processing session with the client device was forcibly terminated (e.g., did not complete successfully). For example, the determination operation 804 may identify certain details about the terminated cloud processing session by accessing and reading a log on the cloud-based server including such information.

A querying operation 806 transmits a query to the client device to determine whether or not to restore the terminated cloud-processing session. For example, the query may cause the client device to display a prompt asking the user whether or not he/she would like to resume the recently-terminated cloud processing session. A receiving operation 708 receives a confirmation from the client device that conveys a user's preference to resume the last cloud processing session (e.g., the forcibly terminated cloud processing session).

In response to this confirmation, a requesting operation 810 requests a new set of access credentials. For example, the cloud-based server may ask the client device to provide the login information (e.g., a username and password) for an authorized account of the cloud processing session. The client device transmits the requested credentials and an authentication operation 812 performs actions to authenticate the received access credentials. Provided the at received access credentials are indeed successfully authentication by the cloud-based server, a transmission operation 814 transmits a cloud-side decryption key from the cloud-based server to the client device. A receiving operation 816 receives, at the cloud-based server, a client-side decryption key from the client device.

A decryption operation 818 uses the client-side decryption key to decrypt the encrypted data of the previous, terminated session that resides on the cloud based server. The client device, in contrast, uses the cloud-side decryption key to decrypt the encrypted data of the previous session that resides on the client device. Once the data of the previous session is decrypted via the decryption operation 818, a resumption operation 810 resumes the previous session from a most-recently saved point in time (e.g., the point in time at which this session was forcibly terminated).

Figure 9:
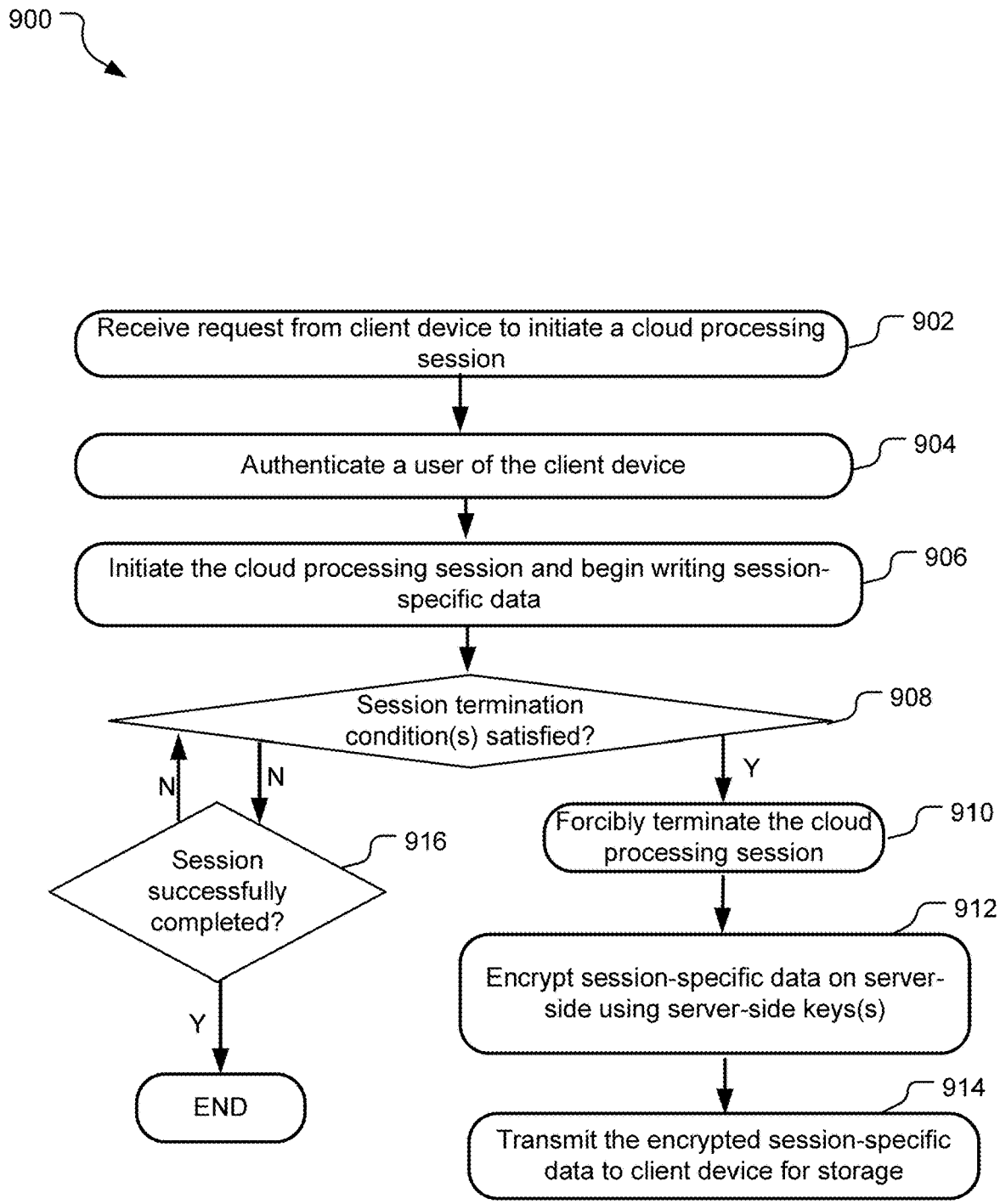
FIG. 9 illustrates another set of example operations for securely recovering terminated cloud processing sessions.

FIG. 9 illustrates another set of example operations 900 for securely recovering terminated cloud processing sessions. Unlike the exemplary operations 700 of FIG. 7, the methodology of FIG. 9 does not provide for an exchange of one or more encryption key(s) between a cloud-based server and a client device. A receiving operation 902 receives a request from a client device to initiate a cloud processing session with a cloud-based server. An authentication operation 904 receives and validates credentials to authenticate a user of the client device. A cloud session initiation operation 906 initiates the cloud processing session and begins writing session data to a cache stored on the cloud-based server.

A monitoring and determination operation 908 continuously monitors security parameters of the cloud processing session to determine if one or more predefined session termination conditions have been satisfied. Responsive to satisfaction of one or more session termination conditions (as described elsewhere herein), a termination operation 910 forcibly terminates the cloud processing session, and an encryption operation 912 encrypts the session-specific data residing within the cache on the cloud-based server using a server-side key, such as a private key of the associated cloud-based service platform or a session-specific key generated based at least in part on a private key. A transmission operation 914 transmits the encrypted session specific data over to the client device for storage. In some implementations, the key(s) used for encryption are encrypted by the cloud-based server and sent in encrypted form, along with the encrypted session-specific data, to the client device. In this case, the client device stores essentially all information that is used to restore the session and the cloud-based server does not have to maintain a table of session-specific keys that are associated with terminated cloud-based processing sessions.

If the determination operation 908 determines that no session termination condition is satisfied, another determination operation 916 determines whether the cloud processing session has yet successfully completed (e.g., is still ongoing). If not, the monitoring and determination operation 908 is repeated until such time that one of the session termination conditions is satisfied or the session successfully completes.

Figure 10:
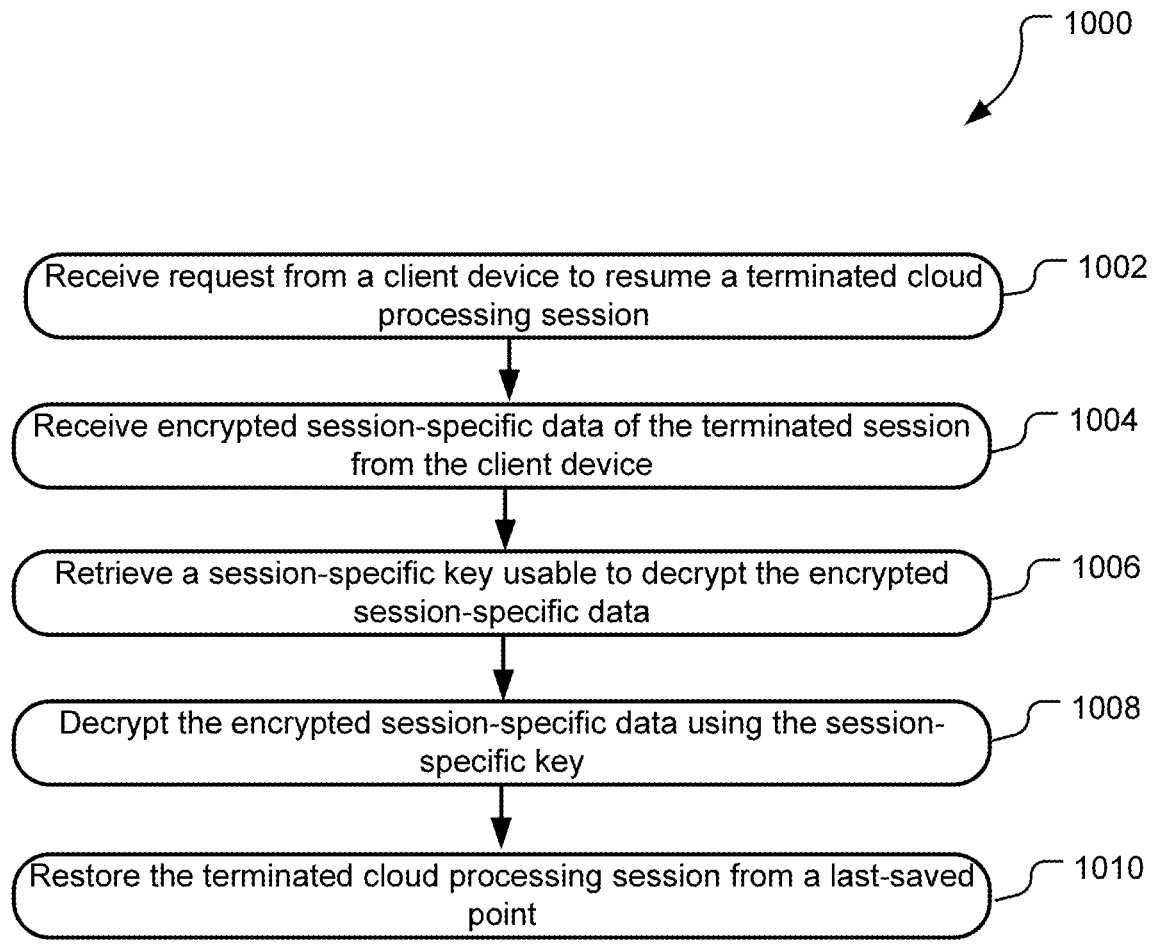
FIG. 10 illustrates further example operations for securely recovering session data of terminated cloud processing sessions.

FIG. 10 illustrates further example operations 1000 for securely recovering session data of terminated cloud processing sessions. In one implementation, the operations 1000 of FIG. 10 are performed following the operations 900 of FIG. 9. A receiving operation 1002 receives, at a cloud-based server, a request from a client device to resume a terminated cloud processing session. Another receiving operation 1004 receives, at the cloud-based server, encrypted session-specific data from the client device.

A key retrieval operation 1006 retrieves a key usable to decrypt the received, encrypted session-specific data. In one implementation, the key is retrieved from a key vault locally maintained and managed by the cloud-based server. For example, the key may be stored in the key value along with session identifying information, such as identifying information for the client device or for the session that is being restored. In another implementation, the key retrieval operation 1006 receives an encrypted key from the client device and decrypts the key, such as using a private key of the device or of the associated cloud-service platform. Once the key is decrypted or otherwise retrieved from the key value, a decryption operation 1008 uses the key to decrypt the encrypted session-specific data using the session-specific key. A restoration operation 1010 restores the terminated cloud processing session from a last-saved point.

Figure 11:
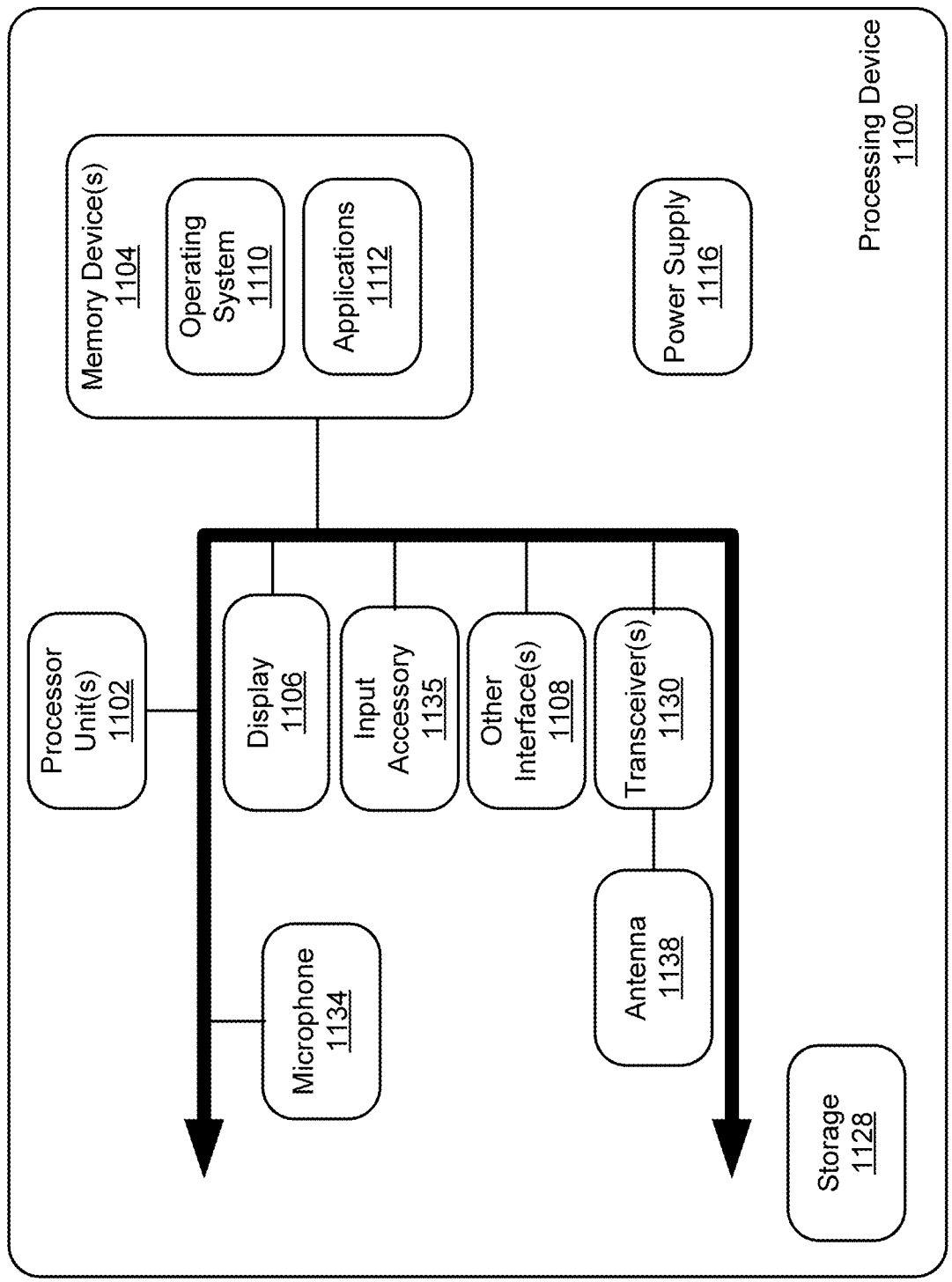
FIG. 11 illustrates an example schematic of a processing device suitable for implementing aspects of the disclosed technology.

FIG. 11 illustrates an example schematic of a processing device 1100 suitable for implementing aspects of the disclosed technology. The processing device 1100 may be configured to perform functionality described herein with respect to either cloud-based server (e.g., of a cloud service platform) or a client device that communicates with the cloud-based server. The processing device 1100 includes one or more processor unit(s) 1102, memory 1104, a display 1106, and other interfaces 1108 (e.g., buttons). The memory 1104 generally includes both volatile memory (e.g., RAM) and non-volatile memory (e.g., flash memory). An operating system 1110, such as the Microsoft Windows® operating system, the Microsoft Windows® Phone operating system or a specific operating system designed for a mixed reality device, resides in the memory 1104 and is executed by the processor unit(s) 1102, although it should be understood that other operating systems may be employed.

One or more applications 1112, such as the access management service 110 or cloud processing session manager 130 of FIG. 1 are loaded in the memory 1104 and executed on the operating system 1110 by the processor unit(s) 1102. Applications 1112 may receive input from various input devices such as a microphone 1134, input accessory 1135 (e.g., keypad, mouse, stylus, touchpad, gamepad, racing wheel, joystick), or inputs from various environmental sensors 1136 such as one or more cameras, microphones, etc.=The processing device 1100 further includes a power supply 1116, which is powered by one or more batteries or other power sources and which provides power to other components of the processing device 1100. The power supply 1116 may also be connected to an external power source (not shown) that overrides or recharges the built-in batteries or other power sources.

The processing device 1100 includes one or more communication transceivers 1130 and an antenna 1138 to provide network connectivity (e.g., a mobile phone network, Wi-Fi®, Bluetooth®). The processing device 1100 may also include various other components, such as a positioning system (e.g., a global positioning satellite transceiver), one or more accelerometers, one or more cameras, an audio interface (e.g., the microphone 1134, an audio amplifier and speaker and/or audio jack), and storage devices 1128. Other configurations may also be employed.

The processing device 1100 may include a variety of tangible computer-readable storage media and intangible computer-readable communication signals. Tangible computer-readable storage can be embodied by any available media that can be accessed by the processing device 1100 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 800. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

An example method disclosed herein provides for transmitting an encryption key of a cloud-based server to a client device in association with initiation of a cloud-based processing session initiated by the client device; instructing the client device to use the encryption key to encrypt a first portion of data of the cloud-based processing session when a session termination condition is satisfied. The method further provides for receiving credentials of the client device in association with a request to re-initiate the terminated cloud-based processing session and, responsive to successful authentication of the received credentials of the client device, transmitting a decryption key of the cloud-based server to the client device along with an instruction to utilize the decryption key to restore the encrypted first portion of the session-specific data on the client device.

In another example method of any preceding method, the method further provides for receiving, at the cloud-based sever, an encryption key of the client device; storing the first portion of the session-specific data generated during the cloud-based processing session on the client device and a second portion of the session-specific data generated on the cloud-based server; and responsive to satisfaction of the session termination condition, forcibly terminating the cloud-based processing session and encrypting the second portion of the session-specific data on the cloud-based server using the encryption key of the client device.

In still another example method of any preceding method, the method further includes receiving a decryption key of the client device and using the decryption key from the client device to restore the encrypted second portion of the session-specific data on the cloud-based server.

In yet still another example method of any preceding method, the method further includes resuming the cloud-based processing session from a last-saved point using the restored first portion of the session-specific data.

In still another example method of any preceding method, the method further includes authenticating the client device responsive to receipt of a request from the client device to initiate the cloud-based processing session and, during the cloud-based processing session, attempting to re-authenticate the client device without prompting a user of the client device for inputs in association with the re-authentication.

In another example method of any preceding method, the method further comprises determining that the attempt to re-authenticate the client device has failed, the failed re-authentication attempt satisfying the session termination condition.

In yet still another example method of any preceding method, the method further comprises collecting one or more biometric signatures of a user of the client device while the cloud-based processing session is active, wherein attempting to re-authenticate the client device further comprises comparing each of the collected biometric signatures to a stored biometric signature of the user to assess a similarity condition.

In still another example method of any preceding method, the stored biometric signature of the user is collected during the cloud-based processing session. In still another example method of any preceding method, the encryption key from the cloud-based server is stored on the client device in a secure memory region inaccessible to an operating system of the client device.

An example system disclosed herein includes memory and a cloud processing session manager stored in the memory. The cloud processing session manager is executable to transmit an encryption key of a cloud-based server to a client device in association with initiation of a cloud-based processing session initiated by the client device and to instruct the client device to use the encryption key to encrypt a first portion of data of the cloud-based processing session when a session termination condition is satisfied. The cloud processing session manager is further configured to terminate the cloud-based processing session responsive to determining that a session termination condition is satisfied and receive credentials of the client device in association with a request to re-initiate the terminated cloud-based processing session. Responsive to successful authentication of the received credentials of the client device, the cloud processing session manager transmits a decryption key of the cloud-based server to the client device along with an instruction to utilize the decryption key from the cloud-based server to restore the encrypted first portion of the session-specific data on the client device.

In another example system of any preceding system, the cloud processing session manager is further configured to receive, at the cloud-based sever, an encryption key of the client device and store the first portion of the data generated during the cloud-based processing session on the client device and a second portion of the data generated on the cloud-based server. Responsive to satisfaction of the session termination condition, the cloud processing session manager forcibly terminates the cloud-based processing session and encrypts the second portion of the session-specific data on the cloud-based server using the encryption key of the client device.

In another example system of any preceding system, the system further includes an access management service stored in the memory and executable to receive credentials of the client device in association with a request to re-initiate the terminated cloud-based processing session and authenticate the credentials.

In another example system of any preceding system, the processing session manager is further configured to receive a decryption key from the client device and use the decryption key from the client device to restore the encrypted second portion of the data on the cloud-based server.

In yet still another example system of any preceding system, the processing session manager is further configured to resume the cloud-based processing session from a last-saved point using the restored first portion of the data and the restored second portion of the data.

In still another example system of any preceding system, the system further includes an access management service stored in memory and configured to authenticate the client device responsive to receipt of a request from the client device to initiate the cloud-based processing session; and during the cloud-based processing session, attempt to re-authenticate the client device without prompting a user of the client device for inputs in association with the re-authentication.

In still another example system of any preceding system, the access management service is further configured to collect one or more biometric signatures of the user while the cloud-based processing session is active and compare the collected biometric signatures of the user to a stored biometric signature of the user to assess a similarity condition.

In yet still another example system of any preceding system, the stored biometric signature of the user is an image that is collected during the cloud-based processing session.

In another example system of any preceding system, the access management service is further configured to determine that the attempt to re-authenticate the client device has failed, and the failure of the re-authentication attempt satisfies the session termination condition.

In still another example system of any preceding system, the encryption key from the cloud-based server is stored on the client device in a secure memory region inaccessible to an operating system of the client device.

One or more tangible computer-readable storage media encoding computer-readable instructions for executing a computer process that includes storing the data generated during a cloud-based processing session on a client device; receiving an instruction, at the client device, that provides for encrypting the stored data on the client device when a session termination condition is satisfied; and encrypting the stored data pursuant to the instruction when the cloud-based processing session is terminated.

In another example computer-readable storage media according to any preceding computer-readable storage, the computer process further comprises receiving, at the client device, an encryption key of a cloud-based server to a client device in association with initiation of a cloud-based processing session initiated by the client device; and on the client device, encrypting the stored data using the encryption key.

An example system disclosed herein includes a means for transmitting an encryption key of a cloud-based server to a client device in association with initiation of a cloud-based processing session initiated by the client device; a means for generating session-specific data during the cloud-based processing session; and a means for instructing the client device to encrypt a first portion of the session-specific data using the encryption key when a session termination condition is satisfied. The system further includes a means for terminating the cloud-based processing session; a means for receiving credentials of the client device in association with a request to re-initiate the terminated cloud-based processing session; and a means for transmitting a decryption key of the cloud-based server to the client device along with an instruction to utilize the decryption key to restore the encrypted first portion of the session-specific data on the client device responsive to successful authentication of the received credentials of the client device.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendix, provide a complete description of the structure and use of exemplary implementations.

What is claimed is:

1. A method comprising:
transmitting an encryption key of a cloud-based server to a client device in association with initiation of a cloud-based processing session initiated by the client device;
receiving, at the cloud-based server, an encryption key of the client device;
generating session-specific data during the cloud-based processing session;
storing a first portion of the session-specific data generated during the cloud-based processing session on the client device and a second portion of the session-specific data generated during the cloud-based processing session on the cloud-based server, the first portion of the session-specific data including client state variables including caches of web service files and the second portion of the session-specific data including intermediate action results comprising query responses or tokens generated during the cloud-based processing session;
instructing the client device to use the encryption key of the cloud-based server to encrypt and save the first portion of the session-specific data on the client device when a session termination condition is satisfied; and
responsive to satisfaction of the session termination condition, forcibly terminating the cloud-based processing session and encrypting the second portion of the session-specific data on the cloud-based server using the encryption key of the client device without saving the first portion of the session-specific data on the cloud-based server.

2. The method of claim 1, further comprising:
at the cloud-based server, receiving a decryption key of the client device and using the decryption key from the client device to restore the encrypted second portion of the session-specific data on the cloud-based server.

3. The method of claim 1, further comprising:
authenticating the client device responsive to receipt of a request from the client device to initiate the cloud-based processing session; and
during the cloud-based processing session, attempting to re-authenticate the client device without prompting a user of the client device for inputs in association with the re-authentication.

4. The method of claim 3, further comprising:
determining that the attempt to re-authenticate the client device has failed, the failed re-authentication attempt satisfying the session termination condition.

5. The method of claim 3, further comprising:
collecting one or more biometric signatures of a user of the client device while the cloud-based processing session is active, wherein attempting to re-authenticate the client device further comprises comparing each of the collected biometric signatures to a stored biometric signature of the user to assess a similarity condition.

6. The method of claim 5, wherein the stored biometric signature of the user is collected during the cloud-based processing session.

7. The method of claim 1, further comprising:
transmitting the second portion of the session-specific data to the client device for storage.

8. The method of claim 1, further comprising:
receiving credentials of the client device in association with a request to re-initiate the terminated cloud-based processing session; and
responsive to successful authentication of the received credentials of the client device, transmitting a decryption key of the cloud-based server to the client device along with an instruction to utilize the decryption key to restore the encrypted first portion of the session-specific data on the client device.

9. The method of claim 8, further comprising:
resuming the cloud-based processing session from a last-saved point using the restored first portion of the session-specific data.

10. A system comprising:
memory; and
a cloud processing session manager stored in the memory and executable to:
transmit an encryption key of a cloud-based server to a client device in association with initiation of a cloud-based processing session initiated by the client device;
receive, at the cloud-based server, an encryption key of the client device;
generate session-specific data during the cloud-based processing session;
store a first portion of the session-specific data generated during the cloud-based processing session on the client device and a second portion of the session-specific data generated during the cloud-based processing session on the cloud-based server, the first portion of the session-specific data including client state variables including caches of web service files and the second portion of the session-specific data including intermediate action results comprising query responses or tokens generated during the cloud-based processing session;
instruct the client device to use the encryption key of the cloud-based server to encrypt and save a first portion of the session-specific data on the client device when a session termination condition is satisfied;
responsive to satisfaction of the session termination condition, forcibly terminate the cloud-based processing session and encrypt the second portion of the session-specific data on the cloud-based server using the encryption key of the client device without saving the first portion of the session-specific data on the cloud-based server.

11. The system of claim 10, further comprising:
an access management service stored in the memory and executable to:
receive credentials of the client device in association with a request to re-initiate the terminated cloud-based processing session; and
authenticate the credentials received from the client device.

12. The system of claim 10, wherein the system further includes an access management service stored in memory and configured to:
authenticate the client device responsive to receipt of a request from the client device to initiate the cloud-based processing session; and
during the cloud-based processing session, attempt to re-authenticate the client device without prompting a user of the client device for inputs in association with the re-authentication.

13. The system of claim 12, wherein the access management service is further configured to:
collect one or more biometric signatures of the user while the cloud-based processing session is active and compare the collected biometric signatures of the user to a stored biometric signature of the user to assess a similarity condition.

14. The system of claim 13, wherein the stored biometric signature of the user is an image that is collected during the cloud-based processing session.

15. The system of claim 12, wherein the access management service is further configured to determine that the attempt to re-authenticate the client device has failed, and wherein the failure of the re-authentication attempt satisfies the session termination condition.

16. The system of claim 10, wherein the cloud processing session manager is further executable to:
receive credentials of the client device in association with a request to re-initiate the terminated cloud-based processing session;
responsive to successful authentication of the received credentials of the client device, transmit a decryption key of the cloud-based server to the client device along with an instruction to utilize the decryption key from the cloud-based server to restore the encrypted first portion of the session-specific data on the client device.

17. The system of claim 16, wherein the cloud processing session manager is further configured to:
receive a decryption key from the client device and use the decryption key from the client device to restore the encrypted second portion of the session-specific data on the cloud-based server.

18. The system of claim 17, wherein the cloud processing session manager is further configured to resume the cloud-based processing session from a last-saved point using the restored first portion of the session-specific data and the restored second portion of the session-specific data.

19. One or more tangible computer-readable storage media encoding computer-readable instructions for executing a computer process, the computer process comprising:
storing a first portion of session-specific data generated during a cloud-based processing session on a client device and a second portion of the session-specific data generated during the cloud-based processing session on a cloud-based server, the first portion of the session-specific data including client state variables including caches of web service files and the second portion of the session-specific data including intermediate action results comprising query responses or tokens generated during the cloud-based processing session;
receiving an instruction, at the client device, to use an encryption key of the cloud-based server to encrypt the first portion of the session-specific data on the client device in response to satisfaction of a session termination condition; and
encrypting the first portion of the session-specific data stored on the client device pursuant to the instruction when the cloud-based processing session is terminated, wherein the second portion of the session-specific data is encrypted on the cloud-based server using the encryption key of the client device in response to termination of the cloud-based processing session, wherein the second portion of the session-specific data is not stored on the client device following termination of the cloud-based processing session and the first portion of the session-specific data is not stored on the cloud-based server following termination of the cloud-based processing session.

* * * * *